(12) United States Patent
Datta et al.

(10) Patent No.: US 7,814,473 B2
(45) Date of Patent: Oct. 12, 2010

(54) FEATURE USAGE BASED TARGET PATCHING

(75) Inventors: Sudip Datta, Foster City, CA (US); Debashis Saha, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 768 days.

(21) Appl. No.: 10/975,978

(22) Filed: Oct. 27, 2004

(65) Prior Publication Data

US 2006/0101450 A1    May 11, 2006

(51) Int. Cl.
    *G06F 9/44* (2006.01)
(52) U.S. Cl. .................. 717/168; 717/171; 717/172
(58) Field of Classification Search .................. None
    See application file for complete search history.

(56) References Cited

U.S. PATENT DOCUMENTS

| | | | |
|---|---|---|---|
| 6,199,204 B1 * | 3/2001 | Donohue ................. | 717/178 |
| 6,317,880 B1 * | 11/2001 | Chamberlain et al. ....... | 717/174 |
| 6,477,703 B1 * | 11/2002 | Smith et al. .................. | 717/168 |
| 6,578,199 B1 * | 6/2003 | Tsou et al. ................... | 717/178 |
| 7,191,435 B2 * | 3/2007 | Lau et al. .................... | 717/168 |
| 2005/0076325 A1 * | 4/2005 | Bergin et al. ................ | 717/100 |
| 2005/0091651 A1 * | 4/2005 | Curtis et al. ................. | 717/168 |

OTHER PUBLICATIONS

Clapp et al, A management Guide to Software Maintenance in COTS-Based Systems, MP 98B0000069, The Mitre Corporation, May 1998, Retrieved fon [Jan. 5, 2010] Retrieved from the Internet URL<http://www.mitre.org/work/tech_papers/tech_papers_98/mgt_guide_sftwrmaint/mgt_guide_sftwrmaint.pdf.*

* cited by examiner

*Primary Examiner*—Tuan Q Dam
*Assistant Examiner*—Cheneca Smith
(74) *Attorney, Agent, or Firm*—Townsend and Townsend and Crew LLP

(57) ABSTRACT

A method for applying patches to one or more applications is provided. The method includes receiving a patch for a feature where the patch includes applicability requirements. The applicability requirements detail requirements that should be met for the patch to be applied. Usage information for the feature is then determined. For example, it is determined if a feature has been used by a client. The patch is then applied to an application if the usage information meets the applicability requirements for the feature.

32 Claims, 6 Drawing Sheets

| Target | Host | Database | Feature Name | Currently Used | Detected Usages | First Usage | Last Usage | Database Version |
|---|---|---|---|---|---|---|---|---|
| #1 | ofermum-pc.us.oracle.com | batman | Partitioning (system) | | 4 | Aug 29, 2004 4:41:22 PM | Sep 23, 2004 11:58:22 PM | 10.1.0.2.0 |
| #2 | ofermum-pc.us.oracle.com | batman | Partitioning (user) | ✓ | 0 | | | 10.1.0.2.0 |
| #3 | usunrao25.us.oracle.com | payroll | Partitioning (system) | ✓ | 26 | Mar 29, 2004 5:55:46 PM | Sep 20, 2004 10:28:57 PM | 10.1.0.2.0 |
| #4 | usunrao25.us.oracle.com | payroll | Partitioning (user) | | 0 | | | 10.1.0.2.0 |

602 604 606 608 610 612 614 616

600 — Save to File

*FIG. 6*

FEATURE USAGE BASED TARGET PATCHING

BACKGROUND OF THE INVENTION

The present invention generally relates to software patches and more particularly to systems and methods for selectively patching features using usage information for the feature.

As software applications become more complicated, the likelihood increases that they may include errors, bugs, security vulnerabilities, etc. One method of fixing any of the above is using a patch. A patch is a release of a software code that is designed to fix a particular feature. A feature may include a product or a part of a product. For example, a patch may be directed towards an entire word processing program or directed toward the spell checking component of the word processing program. When a patch is released to fix a feature, all clients that have the feature installed are patched. Thus, if a patch is released for a word processing program, any clients that have the word processing program installed on their client are patched.

The above method of patching includes many disadvantages. For example, patching all clients that have the feature means that total downtime may be excessive. It may be extremely costly to have client downtime while a client is being patched. For example, when database clients are taken down for patching in a database environment, the database system may not be accessed, which may cause costly delays in accessing data.

BRIEF SUMMARY OF THE INVENTION

The present invention generally relates to patching using usage information for a feature. In one embodiment, a method for applying patches to one or more applications is provided. The method includes receiving a patch for a feature where the patch includes applicability requirements. The applicability requirements detail requirements that should be met in order for the patch to be applied. Usage information for the feature is then determined. For example, it is determined if a feature has been used by a target. The patch is then applied to the target if the usage information meets the applicability requirements for the feature.

In one embodiment, a method for applying patches to one or more targets is provided. The method comprises: receiving a patch, the patch including applicability requirements for a feature; determining usage information for a target in the one or more targets; determining if the usage information meets the applicability requirements for the feature; and applying the patch to the target in the one or more targets if the usage information for the target meets the applicability requirements for the feature.

In another embodiment, a method for defining a patch is provided. The method comprises: defining applicability requirements for a patch, the applicability requirements based on usage information for a feature; and sending the patch to one or more devices, wherein the patch is applied by the one or more devices if usage information collected for the feature meets the applicability requirements for applying the patch.

In yet another embodiment, a system for applying patches to one or more applications is provided. The system comprises: a patch generator configured to distribute a patch, the patch including applicability requirements; one or more targets, each target including one or more features; a usage information collector configured to collect usage information from the one or more targets for the one or more features; a patch applier configured to receive the patch from the patch generator, the patch applier configured to determine if a patch should be applied to a target in the one or more targets if usage information from the one or more targets for the feature meets the applicability requirements associated with the patch.

A further understanding of the nature and the advantages of the inventions disclosed herein may be realized by reference of the remaining portions of the specification and the attached drawings.

BRIEF DESCRIPTION OF THE DRAWINGS

FIG. 6 show a table of usage information according to one embodiment of the present invention.

DETAILED DESCRIPTION OF THE INVENTION

Figure 1:
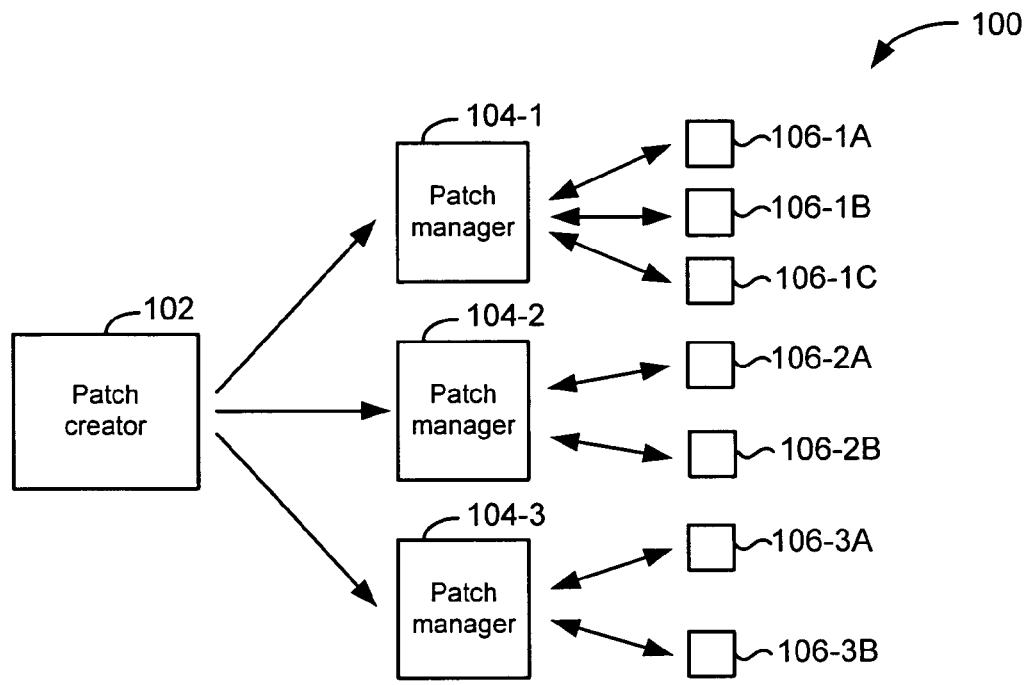
FIG. 1 depicts a system for applying patches according to one embodiment of the present invention.

FIG. 1 depicts a system 100 for applying patches according to one embodiment of the present invention. System 100 includes a patch creator 102, one or more patch managers 104, and one or more targets 106.

Patch creator 102 is configured to create patches. A patch includes hardware, software or any combination thereof configured to fix or update a feature. A feature may be a product or a particular component of a product. For example, a product may be a database application. The database application may include many components, such as partitioning, advanced queuing, context and spatial features, etc. In another example, the product may be a software application, such as a word processing application. Also, the word processing application may include many components, such as a spell checking component, language translation component, grammar checking component, etc.

In one embodiment, applicability requirements are determined for a patch. The applicability requirements are used to determine if a feature should be patched. Accordingly, the patch may not be applied to all features that the patch is configured to fix or update. Rather, depending on the applicability requirements, it is determined if a feature should be patched. For example, as will be discussed in more detail below, usage information is used to determine if a feature should be patched.

Patch manager 104 is coupled to patch creator 102 and to one or more targets 106. As shown, there may be many patch managers 104 coupled to patch creator 102. Each patch manager 104 may manage one or more targets 106. Although a separate patch creator 102 and patch manager 104 are shown, it should be understood that functions described for patch creator 102 and patch managers 104 may be performed by either patch creator 102 or patch managers 104. For example, patch creator 102 may create patches and also perform the functions described with respect to patch managers 104. In this embodiment, patch creator 102 may be coupled to targets 106 without any patch managers 104.

Patch manager 104 may be any computing device configured to receive a patch from patch creator 102 and to selectively determine targets 106 in which to apply the patch. As will be described in more detail below, patch manager 104 is configured to use usage information to determine targets 106 to patch.

Targets 106 may be any device using a feature. For example, a target 106 may be a computing device running a product. The product may include one or more components. In one embodiment, targets 106 may be included in various databases. For example, target 106-1A may be included in a first database and Target 106-1B may be included in a second database. In this embodiment, patch manager 104 may be included in a host that is managing various databases.

Figure 2:
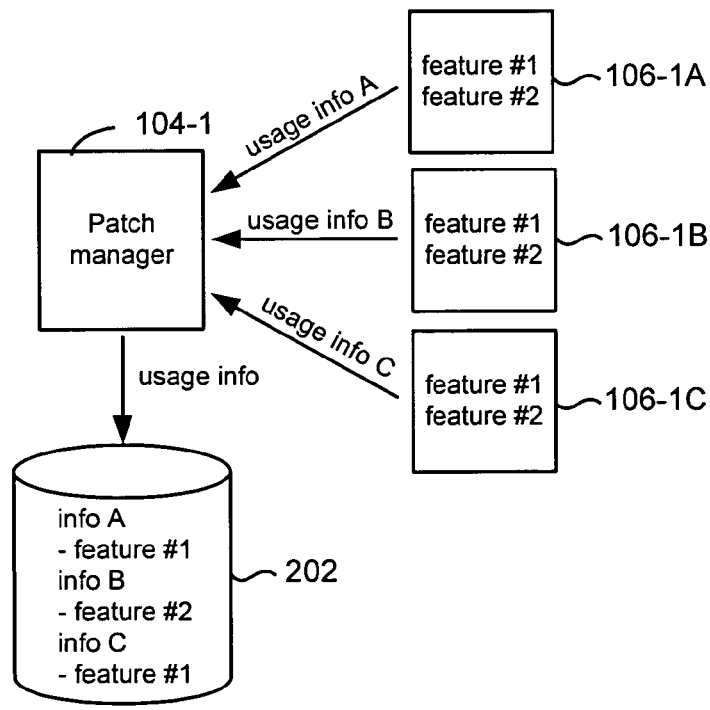
FIG. 2 depicts a system for collecting usage information for targets according to one embodiment of the present invention.

FIG. 2 depicts a system for collecting usage information for targets 106 according to one embodiment of the present invention. Patch manager 104 is configured to apply patches based on applicability requirements associated with a patch for a feature. In one embodiment, the applicability requirements are applied based on usage information from targets 106.

As shown, targets 106-1A, 106-1B, and 106-1C include features #1 and #2. As features are used, usage information is collected by patch manager 104. In one example, feature #1 has been used by target 106-1A, feature #2 has been used by target 106-1B, and feature #1 has been used by target 106-1C. Usage information for these features is then collect by patch manager 104-1.

The usage information may indicate a product that is used. For example, feature #1 may be a word processing product and feature #2 may be a graphics product. The usage information may also be broken down by components. For example, usage information may indicate a product that is being used in addition to the components that are being used within the word processing product. If a spell checking component is being used, the usage information may indicate that the spell checking feature is being used in the word processing product. Examples of usage information that may be collected include the amount of use, time and date of use, how it was used, etc. Usage information may also break down a feature (by version number, configuration, etc.).

FIG. 6 show a table 600 of usage information according to one embodiment of the present invention. Table 600 provides a summary of usage information for various targets 106.

In column 602, various targets 106 (e.g., hosts) are listed. Each target 106 is associated with a database, as depicted in column 604.

Features that may be used by each target 106 are shown in column 606. A partitioning feature (system) and a partitioning feature (user) has been used by targets 106. Also, column 608 indicates if the features are currently being used, column 610 depicts the number of detected usages, column 612 indicates if the first usage of the feature, and column 616 depicts the database version of the feature.

As shown, targets #2 and #4 have not used the feature (indicated by the zero value in column 610). These targets #2 and #4 may not be patched if a patch for the partitioning feature is received. Targets #1 and #3, however, have used the feature and may be patched if the usage information meets the applicability requirements. For example, applicability requirements may require that usages be above 20. Then, only target #3 may be patched because its number of usages is above 20 (see column 610).

The usage information is then stored in storage 202. Storage 202 may be a database or any other memory device. The information may be stored and sorted by each target 106. For example, usage information A indicates that target 106-1A has used feature #1, usage information B indicates that target 106-1B has used feature #2, and usage information C indicates that target 106-1C has used feature #3.

Figure 3:
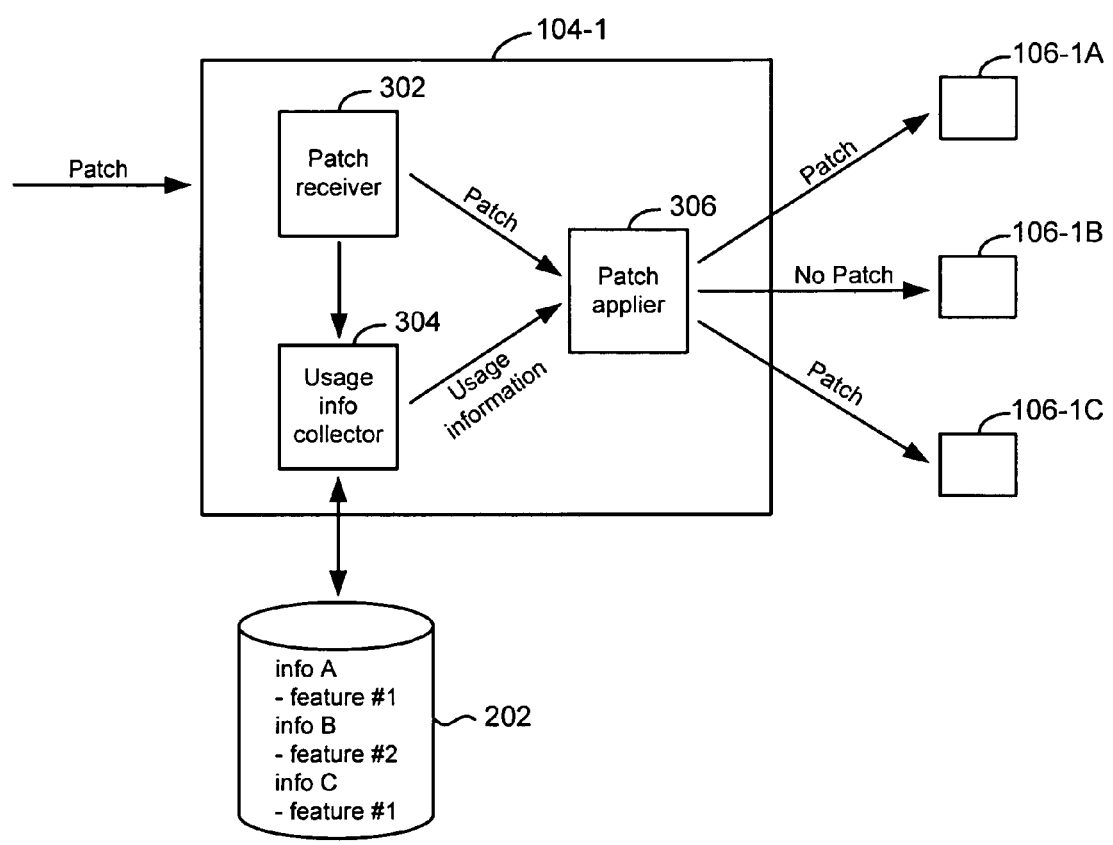
FIG. 3 depicts a more detailed block diagram of patch manager according to one embodiment of the present invention.

FIG. 3 depicts a more detailed block diagram of patch manager 104-1 according to one embodiment of the present invention. Patch manager 104-1 includes a patch receiver 302, a usage information collector 304, and a patch applier 306. As shown, a patch is received at a patch receiver 302 of patch manager 104-1.

Patch receiver 302 is then configured to determine applicability requirements for the patch. For example, the applicability requirements may be attached to the patch as metadata. The metadata is parsed and the applicability requirements are determined. Applicability requirements may be that usages should be over a certain amount, a database version should match, operating systems should match, etc.

The applicability requirements may indicate one or more features in which the patch should be applied. Also, the applicability requirements may indicate other requirements for features that are needed in order for the patch to be applied. For example, certain thresholds of usage information may be included in the applicability requirements. Thus, a feature may be used by a target 106 but still may not be patched because the applicability requirements require a certain amount of usage before a patch is applied.

The applicability requirements may also include requirements that are not directly associated with a single target 106. For example, many targets 106 may use a feature. If the total usage of features between targets 106 meets the applicability requirements, then all targets 106 using the feature may be patched.

The applicability requirements may thus be applied across multiple targets 106. If the requirements are distributed among targets 106, then usage information from multiple targets 106 may have to meet the usage requirements. If the usage information meets the applicability requirements for the multiple targets 106, then a patch may be applied to features on the multiple targets 106.

Also, although a single feature is described as being patched. It will be understood that multiple features may be associated with a patch. Thus, usage information for the multiple features may need to be satisfied. If the usage features are satisfied, then each feature in the multiple features may be patched. Also, possibly only a subset of the multiple features may be patched. For example, a feature may need to be patched only if it is used in conjunction with another feature. Thus, usage information for both features may be determined but only one of the features patched.

The above concept describing the patching of multiple features may also be applied to multiple targets 106. For example, a first target 106 may use a first feature and a second target 106 may use a second feature. If the combined usage of the first and second features meets the applicability requirements, then the first and/or second feature may be patched.

Usage information collector 304 is configured to receive the applicability requirements and to determine relevant usage information for the applicability requirements. For example, if the patch is for a feature #1, usage information for targets 106 that use feature #1 is retrieved from storage 202. As discussed above, target 106-1A and target 106-1C have used feature #1, and usage information for feature #1 is sent to patch applier 306.

Patch applier 306 is configured to determine targets 106 in which to apply a patch. Patch applier 306 receives the patch from patch receiver 302 and usage information from usage information collector 304. Patch applier 306 then uses the applicability requirements associated with the patch to determine if a patch should be applied to a target 106. For example, the usage information for a feature that is being patched is analyzed. If the usage information for the feature meets the applicability requirements, then that target 106 is patched.

For example, target 106-1A and target 106-1C may have used feature #1. The usage information is analyzed to determine if it meets the applicability requirements for the patch. For example, use of feature #1 may only be required for the patch to be applied. Also, other requirements may be analyzed. For example, a requirement may be that feature #1 was used a certain number of times. If the usage information for feature #1 for a target 106 does not meet this requirement, then the patch may not be applied to that target 106 even though the feature was used. Assuming the use of feature #1 by target 106-1A and target 106-1C meets the applicability requirement, patch applier 306 patches target 106-1A and target 106-1C. There is no usage information for feature #1 for target 106-1B. Accordingly, the usage information does not meet the applicability requirements and target 106-1B is not patched.

Thus, a feature is not patched if the feature's usage does not meet the applicability requirements for a patch. For example, if a target 106 has not used a feature, then it may not be patched. Also, if the use of the feature does not meet the requirements for the patch, then it may not be patched. For example, a feature may be used by a target 106 but in a way that the patch does not affect that usage. For example, an English language translator may be used in a product. However, the patch may be directed towards a language translator for another language, such as Korean. Accordingly, the feature may have been used by a target 106 but the usage information does not meet the applicability requirements because the applicability requirements may indicate that only targets 106 that have used a Korean language translator pack should be patched. Thus, it is assumed that users that have not used a Korean language translator do not need a patch for that feature. The patch may not be necessary because a user may never use the Korean language translator. Although the patch is not applied, patch applier 306 may be configured to detect if the Korean language translator is subsequently used. Then, after it is used, the patch may be applied.

Accordingly, targets 106 are selectively patched and unnecessary downtime for a target 106 may be avoided. Also, a feature is patched when it is being used in a way that meets the applicability requirements. Accordingly, unnecessary patching may be avoided in addition to unnecessary downtime.

Figure 4:
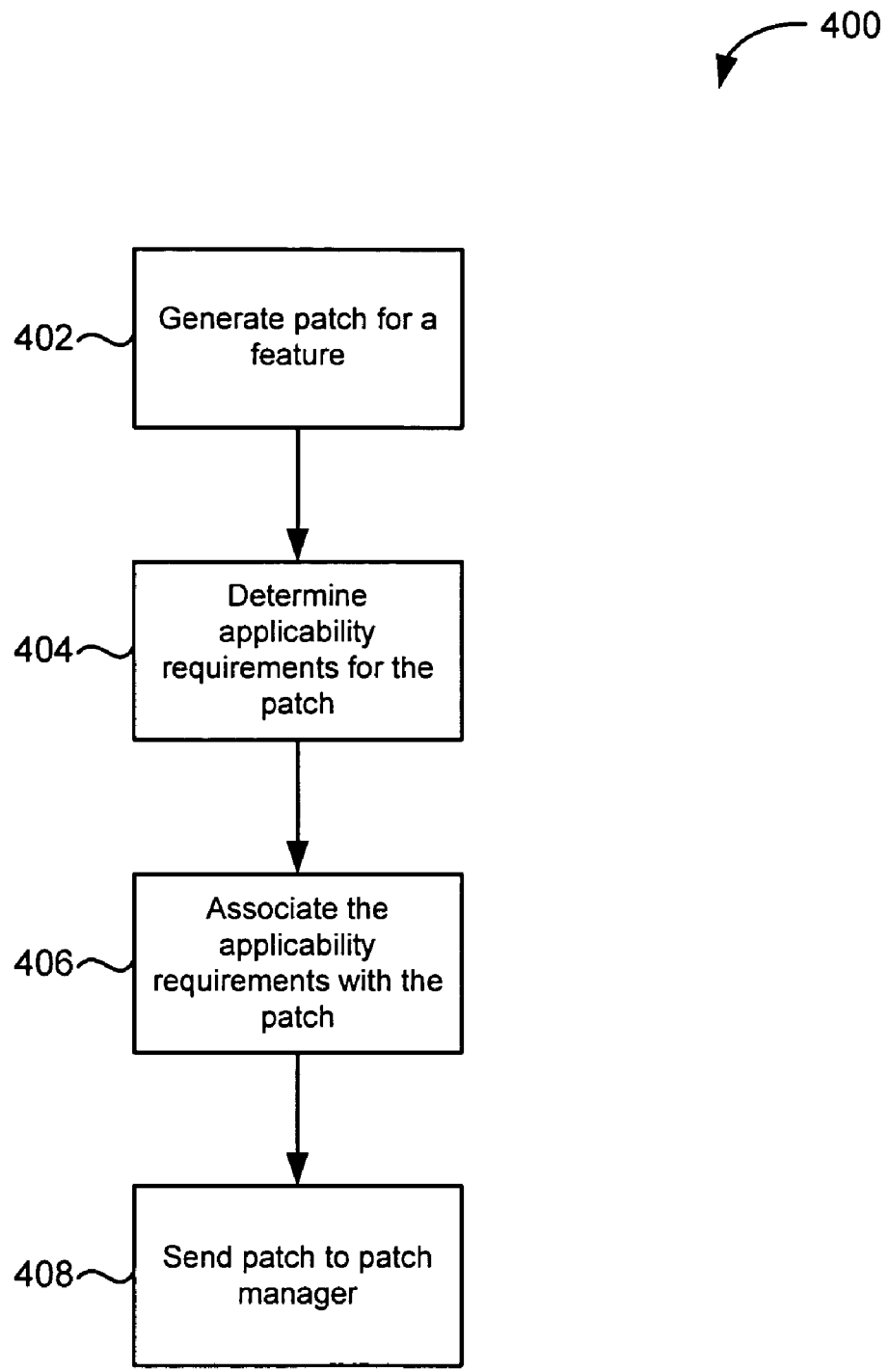
FIG. 4 depicts a simplified flowchart of a method for creating a patch according to one embodiment of the present invention.

FIG. 4 depicts a simplified flowchart 400 of a method for creating a patch according to one embodiment of the present invention. In step 402, a patch for a feature is generated. The patch may be hardware, software, or any combination thereof configured to update or fix a particular feature.

In step 404, applicability requirements for the patch are determined. The applicability requirements may be based on usage information for the feature.

In step 406, the applicability requirements are associated with a patch. In one embodiment, the applicability requirements are included in metadata. The metadata is then attached to the patch.

In step 408, the patch is sent to one or more patch managers 104 for application. In one embodiment, the patch may be sent to all patch managers 104 coupled to patch creator 102.

In other embodiments, the patch may be selectively sent to patch managers 104. For example, it may be known that the feature is not being used at targets 106 being managed by a patch manager 104. Accordingly, the patch may not be sent to that patch manager 104. Also, it should be understood that the patch may be sent directly to targets 106. In this case, targets 106 may determine usage information and determine if a patch should be applied.

In another embodiment, patch creator 102 may collect usage information for clients 106 and apply the patch based on the usage information directly to clients 106. In this case, patch creator 102 may be connected to targets 106 directly. For example, an operating system on a computer may be updated with a patch when the computer is turned on. Patch creator 102 may detect that a computer is on and selectively apply the patch.

Figure 5:
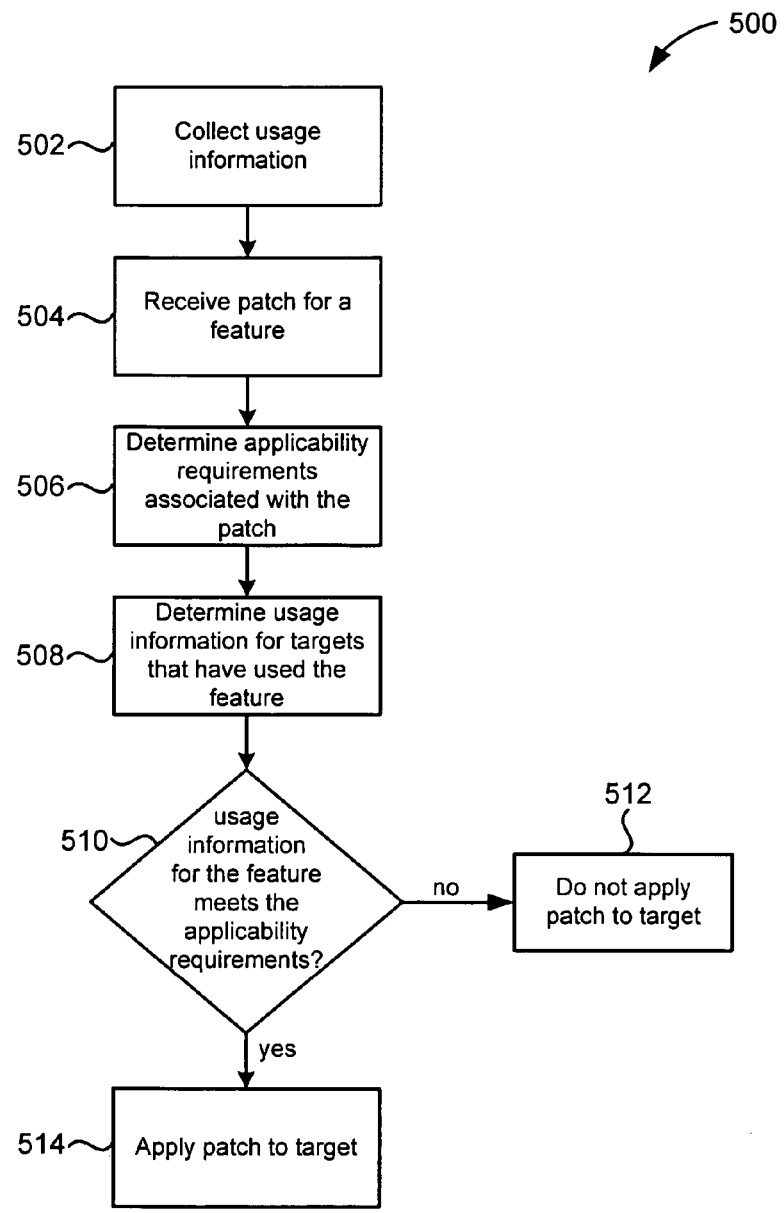
FIG. 5 depicts a simplified flowchart of a method for applying patches according to one embodiment of the present invention.

FIG. 5 depicts a simplified flowchart 500 of a method for applying patches according to one embodiment of the present invention. In step 502, usage information from targets 106 is collected. The usage information may be collected for all features that a target 106 is using or for only certain features.

In step 504, patch manager 104 receives a patch for a feature. The patch may also include applicability requirements that are associated with the patch.

In step 506, patch manager 104 determines applicability requirements associated with the patch. For example, the patch may be parsed and the metadata attached to the patch is determined.

In step 508, usage information for targets 106 that have used the feature is determined. For example, usage information for a feature in storage 202 may be accessed. Targets 106 that used the feature are then determined.

In step 510, patch manager 104 determines if the usage information for the feature meets the applicability requirements for each target 106. If the usage information does not meet the applicability requirements, then the patch is not applied to the target 106 associated with the usage information.

If usage information meets the applicability requirements, then, in step 514, the patch is applied to the target 106 associated with the usage information.

Accordingly, a patch for a feature may be selectively applied to targets 106. The patch is applied based on usage information for the feature. For example, a target 106 may include a product. A patch may be for a component of the product. If the component is used, then it may be determined that the patch should be applied. Also, if the feature is not being used, then the patch may not be applied.

Unnecessary downtime is thus avoided by selectively patching features. For example, a target may never use a feature. Thus, if the feature is never used, it may not make sense to bring the target down in order for the patch to be installed. Rather, a trigger may be stored at patch manager 104 that indicates that if a feature is used, then the patch should be applied. Accordingly, a patch may not be applied until usage information indicating that a feature is being used is received.

Figure 7:
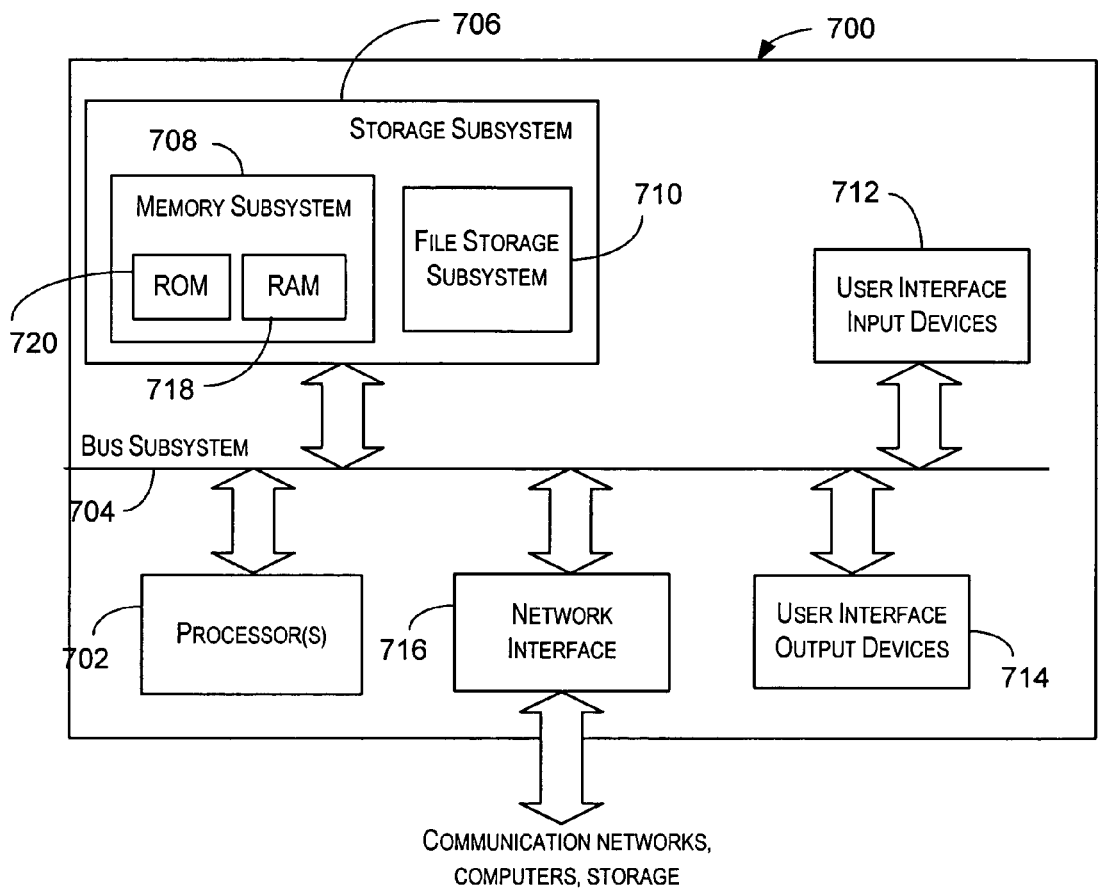
FIG. 7 is a simplified block diagram of a computer system according to an embodiment of the present invention.

FIG. 7 is a simplified block diagram of a computer system 700 according to an embodiment of the present invention. Embodiments of the present invention may be implemented using computer system 700. As shown in FIG. 7, computer system 700 includes at least one processor 702, which communicates with a number of peripheral devices via a bus subsystem 704. These peripheral devices may include a storage subsystem 706, comprising a memory subsystem 708 and a file storage subsystem 710, user interface input devices 712, user interface output devices 714, and a network interface subsystem 716. The input and output devices allow user interaction with computer system 700. A user may be a human user, a device, a process, another computer, or the like. Network interface subsystem 716 provides an interface to other computer systems and communication networks.

Bus subsystem 704 provides a mechanism for letting the various components and subsystems of computer system 700 communicate with each other as intended. The various subsystems and components of computer system 700 need not be at the same physical location but may be distributed at various locations within a network. Although bus subsystem 704 is shown schematically as a single bus, alternative embodiments of the bus subsystem may utilize multiple busses.

User interface input devices 712 may include a remote control, a keyboard, pointing devices, a mouse, trackball, touchpad, a graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 700.

User interface output devices 714 may include a display subsystem, a printer, a fax machine, or non-visual displays such as audio output devices. The display subsystem may be a cathode ray tube (CRT), a flat-panel device such as a liquid crystal display (LCD), a projection device, or the like. The display subsystem may also provide non-visual display such as via audio output devices. In general, use of the term "output device" is intended to include all possible types of devices and ways to output information from computer system 700.

Storage subsystem 706 may be configured to store the basic programming and data constructs that provide the functionality of the computer system and of the present invention. For example, according to an embodiment of the present invention, software modules implementing the functionality of the present invention may be stored in storage subsystem 706. These software modules may be executed by processor(s) 702. In a distributed environment, the software modules may be stored on a plurality of computer systems and executed by processors of the plurality of computer systems. Storage subsystem 706 may also provide a repository for storing various databases that may be used by the present invention. Storage subsystem 706 may comprise memory subsystem 708 and file storage subsystem 710.

Memory subsystem 708 may include a number of memories including a main random access memory (RAM) 718 for storage of instructions and data during program execution and a read only memory (ROM) 720 in which fixed instructions are stored. File storage subsystem 710 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media. One or more of the drives may be located at remote locations on other connected computers.

Computer system 700 itself can be of varying types including a personal computer, a portable computer, a workstation, a computer terminal, a network computer, a mainframe, a kiosk, a personal digital assistant (PDA), a communication device such as a cell phone, or any other data processing system. Server computers generally have more storage and processing capacity then client systems. Due to the ever-changing nature of computers and networks, the description of computer system 700 depicted in FIG. 7 is intended only as a specific example for purposes of illustrating the preferred embodiment of the computer system. Many other configurations of a computer system are possible having more or fewer components than the computer system depicted in FIG. 7.

The present invention can be implemented in the form of control logic in software or hardware or a combination of both. The control logic may be store in an information storage medium as a plurality of instructions adapted to direct an information processing device to perform a set of steps disclosed in embodiment of the present invention. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for applying patches to a plurality of targets, the method comprising:

receiving, at a patch management device, information identifying a plurality of targets to which patches may be applied;

receiving, at the patch management device, usage information from each of the plurality of targets, usage information from a target indicative of:

whether each of one or more features available on the target is being used on the target, and an amount of usage on the target for each of the one or more features;

storing the usage information from each of the plurality of targets in a database associated with the patch management device;

receiving, at the patch management device, one or more patches that may be applied to the plurality of targets, the one or more patches configured to fix or update at least one feature that may be available on at least one target in the plurality of targets;

receiving, at the patch management device, a set of one or more applicability requirements that must be met for each patch in the one or more patches in order for the patch management device to apply the patch, at least one applicability requirement in the set of applicability requirements defining:

when usage information combined from multiple targets is satisfied in order for the patch management device to apply a patch specified by the at least one applicability requirement, or when usage information combined from multiple features is satisfied in order for the patch management device to apply the patch specified by the at least one applicability requirement;

determining, with one or more processors associated with the patch management device, whether at least one feature specified by the at least one applicability requirement is being used on multiple targets by a first combined amount that satisfies the at least one applicability requirement based on the stored usage information for each of the plurality of targets or whether multiple features are being used on at least one target by a second combined amount that satisfies the at least one applicability requirement based on the stored usage information for each of the plurality of targets; and automatically causing, with the one or more processors associated with the patch management device, the patch associated with the at least one applicability requirement to be selectively applied to:
- multiple targets in the plurality of targets when at least one feature specified by the at least one applicability requirement is being used on the multiple targets by the first combined amount that satisfies the at least one applicability requirement, or
- at least one target when multiple features are being used on the at least one target by the second combined amount that satisfies the at least one applicability requirement.

2. The method of claim 1, wherein a feature available on a target in the plurality of targets comprises a product.

3. The method of claim 2, wherein a feature available on a target in the plurality of targets comprises a component in the product.

4. The method of claim 1, wherein the set of one or more applicability requirements comprises a set of rules, the set of rules based on usage information for the feature associated with the patch.

5. The method of claim 1, wherein information specifying the set of one or more applicability requirements is sent with the patch to the patch management device.

6. The method of claim 1, wherein information specifying the set of one or more applicability requirements comprises metadata associated with the patch.

7. A method for defining a patch, the method comprising:
- receiving, at a patch creation device, a patch that may be applied to a plurality of target devices, the patch configured to fix or update at least one feature that may be available on at least one target device in the plurality of target devices;
- receiving, at the patch creation device, information for uploading the patch to one or more patch management devices;
- receiving, at the patch creation device, a set of one or more applicability requirements that must be met for the patch in order for the one or more patch management devices to apply the patch, at least one applicability requirement in the set of applicability requirements defining:
  - when usage information combined from multiple target devices is satisfied in order for the one or more patch management devices to apply a patch specified by the at least one applicability requirement, or
  - when usage information combined from multiple features is satisfied in order for the one or more patch management devices to apply the patch specified by the at least one applicability requirement;
- receiving, at the patch creation device, information for uploading the set of applicability requirements associated with the patch to the one or more patch management devices; and
- causing, with one or more processors associated with the patch creation device, the patch and the set of applicability requirements to be uploaded to the one or more patch management devices such that the one or more patch management devices are configured to:
  - determine whether at least one feature specified by the at least one applicability requirement is being used on multiple targets by a first combined amount that satisfies the at least one applicability requirement based on usage information for each of the plurality of target devices or whether multiple features are being used on at least one target device by a second combined amount that satisfies the at least one applicability requirement based on usage information for the at least one target device, and
  - automatically cause the patch to be selectively applied to multiple target devices in the plurality of target device when the at least one feature specified by the at least one applicability requirement is being used on the multiple targets by the first combined amount that satisfies the at least one applicability requirement or at least one target device when multiple features are being used on the at least one target device by the second combined amount that satisfies the at least one applicability requirement.

8. The method of claim 7, further comprising attaching information specifying the set of one or more applicability requirements to the patch at the patch creation device as metadata.

9. The method of claim 7, further comprising determining from which of a plurality of patch management devices to send the patch to the plurality of target devices.

10. The method of claim 7, wherein the plurality of target devices are using the at least one feature specified by the at least one applicability requirement or the multiple features specified by the at least one applicability requirement when the patch is selectively applied.

11. The method of claim 7, wherein the at least one feature that may be available on the at least one target device comprises a product.

12. The method of claim 11, wherein the at least one feature that may be available on the at least one target device comprises a component in the product.

13. The method of claim 7, wherein the set of one or more applicability requirements comprises a set of rules, the set of rules based on usage information for the feature associated with the patch.

14. A system for applying patches to one or more applications, the system comprising:
- a processor; and
- a memory coupled to the processor, the memory configured to store code modules executable by the processor, the memory comprising:
  - a patch generator module configured to distribute a patch that may be applied to a plurality of targets, the patch configured to fix or update at least one feature that may be available on at least one target in the plurality of targets, the patch generator further providing information associated with the patch specifying a set of one or more applicability requirements that must be met in order for the patch to apply, at least one applicability requirement defining when usage information from multiple targets must be met in order for the patch to be applied to the multiple targets or when usage information from multiple features must be met in order for the patch to be applied to at least one target in the plurality of targets;
  - a usage information collector module configured to collect usage information from each of the plurality of targets, usage information from a target indicative of whether each of one or more features available on the target is being used on the target, and an amount of usage on the target for each of the one or more features;
  - a patch applier module configured to:
    - determine based on the usage information from each of the plurality of targets whether at least one feature specified by the at least one applicability requirement is being used on multiple targets by a first combined amount that satisfies the at least one applicability requirement or whether multiple features are being used on at least one target by a second combined amount that satisfies the at least one applicability requirement, and automatically apply the patch specified by the at least one applicability requirement selectively to multiple targets in the plurality of targets when at least one feature is being used by the multiple targets by the first combined amount that satisfies the at least one applicability requirement or to at least one target when multiple features are being used on the at least one target by the second combined amount that satisfies the at least one applicability requirements.

15. The system of claim 14, wherein the one or more targets comprise clients coupled to the patch applier.

16. The system of claim 14, further comprising a storage device configured to store the collected usage information.

17. The system of claim 14, wherein the at least one feature that may be available on at least one target in the plurality of targets comprises a product.

18. The system of claim 17, wherein the at least one feature that may be available on at least one target in the plurality of targets comprises a component in the product.

19. The system of claim 14, wherein the set of one or more applicability requirements comprises a set of rules, the set of rules based on usage information for the feature associated with the patch.

20. An information storage medium having a plurality of instructions adapted to direct an information processing device for applying patches to a plurality of targets, the information storage medium comprising:

instructions for receiving information identifying a plurality of targets to which patches may be applied;

instructions for receiving usage information from each of the plurality of targets, usage information from a target indicative of:

whether each of one or more features available on the target is being used on the target, and an amount of usage on the target for each of the one or more features;

instructions for receiving one or more patches that may be applied to the plurality of targets, the one or more patches configured to fix or update at least one feature that may be available on at least one target in the plurality of targets;

instructions for receiving a set of one or more applicability requirements that must be met for each patch in the one or more patches in order to apply the patch, at least one applicability requirement in the set of applicability requirements defining:

when usage information combined from multiple targets is satisfied in order to apply a patch specified by the at least one applicability requirement, or when usage information combined from multiple features is satisfied in order to apply the patch specified by the at least one applicability requirement;

instructions for determining whether at least one feature specified by the at least one applicability requirement is being used on multiple targets by a first combined amount that satisfies the at least one applicability requirement based on the usage information for each of the plurality of targets or whether multiple features are being used on at least one target by a second combined amount that satisfies the at least one applicability requirement based on the usage information for each of the plurality of targets; and instructions for automatically applying the patch associated with the at least one applicability requirement selectively to multiple targets in the plurality of targets when at least one feature specified by the at least one applicability requirement is being used by the multiple targets by the first combined amount that satisfies the at least one applicability requirement or to at least one target when the multiple features are being used on the at least one target by the second combined amount that satisfies the at least one applicability requirement.

21. The information storage medium of claim 20, wherein a feature available on a target in the plurality of targets comprises a product.

22. The information storage medium of claim 21, wherein a feature available on a target in the plurality of targets comprises a component in the product.

23. The information storage medium of claim 20, wherein the set of one or more applicability requirements comprises a set of rules, the set of rules based on usage information for the feature associated with the patch.

24. The information storage medium of claim 20, wherein information specifying the one or more applicability requirements is sent with the patch.

25. The information storage medium of claim 20, wherein information specifying one or more applicability requirements comprises metadata associated with the patch.

26. An information storage medium having a plurality of instructions adapted to direct an information processing device for defining a patch, the information storage medium comprising:

instructions for receiving a patch that may be applied to a plurality of target devices, the patch configured to fix or update at least one feature that may be available on at least one target device in the plurality of target devices;

instructions for receiving information for uploading the patch to one or more patch management devices;

instructions for receiving a set of one or more applicability requirements that must be met for the patch in order for the one or more patch management devices to apply the patch, at least one applicability requirement in the set of applicability requirements defining:

when usage information combined from multiple target devices is satisfied in order for the one or more patch management devices to apply a patch specified by the at least one applicability requirement, or when usage information combined from multiple features is satisfied in order for the one or more patch management devices to apply the patch specified by the at least one applicability requirement;

instructions for receiving information for uploading the set of applicability requirements associated with the patch to the one or more patch management devices; and instructions for causing the patch and the set of applicability requirements to be uploaded to the one or more patch management devices such that the one or more patch management devices are configured to:

determine whether at least one feature specified by the at least one applicability requirement is being used on multiple target devices by a first combined amount that satisfies the at least one applicability requirement based on usage information for each of the plurality of target devices or whether multiple features are being used on at least one target device by a second combined amount that satisfies the at least one applicability requirement based on usage information for the at least one target device, and automatically cause the patch to be selectively applied to multiple target devices when at least one feature is being used by the multiple target devices by the first combined amount that satisfies the at least one applicability requirement or to at least one target device when multiple features are being used on the at least one target device by the second combined amount that satisfies the at least one applicability requirement.

27. The information storage medium of claim 26, further comprising instructions for attaching information specifying the one or more applicability requirements to the patch as metadata.

28. The information storage medium of claim 26, further comprising determining from which of a plurality of source devices to send the patch to target devices.

29. The information storage medium of claim 26, wherein the plurality of target devices are using the at least one feature specified by the at least one applicability requirement or the second multiple features specified by the at least one applicability requirement when the patch is selectively applied.

30. The information storage medium of claim 26, wherein the at least one feature that may be available on the at least one target device comprises a product.

31. The information storage medium of claim 30, wherein the at least one feature that may be available on the at least one target device comprises a component in the product.

32. The information storage medium of claim 26, wherein the set of applicability requirements comprises a set of rules, the set of rules based on usage information for the feature associated with the patch.

* * * * *

UNITED STATES PATENT AND TRADEMARK OFFICE
CERTIFICATE OF CORRECTION

| | | |
|---|---|---|
| PATENT NO. | : 7,814,473 B2 | Page 1 of 1 |
| APPLICATION NO. | : 10/975978 | |
| DATED | : October 12, 2010 | |
| INVENTOR(S) | : Sudip Datta et al. | |

It is certified that error appears in the above-identified patent and that said Letters Patent is hereby corrected as shown below:

In column 14, line 4, in claim 29, before "multiple" delete "second".

Signed and Sealed this
Thirty-first Day of May, 2011

David J. Kappos
*Director of the United States Patent and Trademark Office*